US006485024B1

(12) United States Patent
Pippert et al.

(10) Patent No.: US 6,485,024 B1
(45) Date of Patent: Nov. 26, 2002

(54) SPLIT MECHANICAL FACE SEAL

(75) Inventors: Frederick B. Pippert, Sugar Land; John I. Nunn, II, Spring, both of TX (US)

(73) Assignee: Utex Industries, Inc., Houston, TX (US)

( * ) Notice: Subject to any disclaimer, the term of this patent is extended or adjusted under 35 U.S.C. 154(b) by 72 days.

(21) Appl. No.: 09/656,110

(22) Filed: Sep. 6, 2000

(51) Int. Cl.$^7$ ................................................. F16J 15/34
(52) U.S. Cl. ......................... 277/370; 277/374; 277/377
(58) Field of Search ................................ 277/358, 370, 277/371, 374, 375, 377, 379, 390

(56) References Cited

U.S. PATENT DOCUMENTS

| | | | | |
|---|---|---|---|---|
| 4,502,694 A | * | 3/1985 | Uhrner | ........................ 277/373 |
| 4,576,384 A | | 3/1986 | Azibert | |
| 5,020,809 A | * | 6/1991 | Mullaney | ..................... 277/370 |
| 5,058,904 A | * | 10/1991 | Nevola | ......................... 277/370 |
| 5,354,070 A | * | 10/1994 | Carmody | ..................... 277/370 |
| 5,370,401 A | | 12/1994 | Sandgren | |
| 5,961,122 A | | 10/1999 | Marsi | |

FOREIGN PATENT DOCUMENTS

WO          WO89/02999      *   4/1989

OTHER PUBLICATIONS

Flier: "Chesterton 221 Split Seal," 6 pages. A. W. Chesterton Co., Stoneham, Massachusetts, 1990.
Flier: "Chesterton 442 Split Mechanical Seal," 4 pages. A. W. Chesterton Co., Stoneham, Massachusetts, 1994.
Flier: "The PSS Dura Seal," 4 pages. Durametallic Corporation, Kalamazoo, Michigan, 1990.
Flier: "Style 85 Split Cartridge Seal," 5 pages. Flex–A–Seal, Inc., Essex Junction, Vermont. Admitted prior art.
Flier: "Power Packing's New 1200S Split Seal," 2 pages. Power Packing Company, Inc., Baton Rouge, Louisiana. Admitted prior art.
Flier: "PPC's 2400S Split Double Seal," 4 pages. Power Packing Company, Inc., Baton Rouge, Louisiana. Admitted prior art.
Flier: "John Crane Type 3710 Cartridge Split Seal," 2 pages. John Crane Sealol, Cranston, Rhode Island, 1998.
Flier: "PPC's 1200S Split Seal," 4 pages. PPC Mechanical Seals, Baton Rouge, Louisiana. Admitted prior art.

* cited by examiner

*Primary Examiner*—Chuck Y. Mah
*Assistant Examiner*—John L. Beres
(74) *Attorney, Agent, or Firm*—Browning Bushman P.C.

(57) ABSTRACT

A split mechanical face seal having a rotating seal assembly comprising a rigid seal ring of split ring segments and a pair of attachable body ring segments holding the rotating seal ring segments together when the body ring segments are attached, a stationary seal ring assembly comprising a rigid seal ring of split ring segments and a pair of attachable housing segments holding the stationary seal ring segments together when the housing segments are attached, a single segment retainer ring having a split forming first and second opposing end faces, the retainer ring being made of a flexible material, the retainer ring being operatively engaged with the stationary seal ring segments and resilient members carried by the retainer ring and operatively engageable with axially facing abutments formed in the housing segments when the housing segments are attached such that the retainer ring exerts a biasing force against the stationary seal ring segments in a direction toward the rotating seal ring segments.

21 Claims, 6 Drawing Sheets

SPLIT MECHANICAL FACE SEAL

BACKGROUND OF THE INVENTION

1. Field of the Invention

The present invention relates to mechanical seals for pumps and other machinery having rotating shafts and, more particularly, to a split mechanical face seal.

2. Description of the Prior Art

Mechanical seals are used in a wide variety of machines, e.g., pumps, having rotating shafts that pass through housings in order to prevent leakage of pressurized fluids. In one type of mechanical seal, the rotary face seal, sealing is achieved by arranging at least two rigid, durable sealing rings having flat, radially extending sealing surfaces axially adjacent each other and concentrically about the shaft so that the faces are in sealing contact. One seal ring is held stationary in the seal housing or gland while the other rotates with the shaft.

Repair or replacement of parts of such seals is difficult whenever inaccessibility of the outboard end of the shaft or the location of this machine makes it impossible to take the seal off the end of the shaft. In such situations, the machines themselves must be disassembled.

One solution to this problem has been to split the sealing rings and other seal parts radially into two or more segments so that each ring may be removed from the seal and new rings reassembled within the seal and about the shaft as disclosed, for example, in U.S. Pat. Nos. 4,576,384 and 5,961,122, both of which are incorporated herein by reference for all purposes.

Split mechanical face seals of the prior art typically have numerous parts. For example, it is common in split face seals to bias the stationary face seal against the rotating face seal by means of a plurality of springs carried in the gland or housing of the mechanical seal. In assembling split seals employing multiple springs for biasing purposes, it is not uncommon for the springs to fall out of the gland or other spring retainer during assembly, making the assembly job tedious and time-consuming. Furthermore, it is difficult to hold various parts of the split seal assembly in concentric relationship with the shaft on which they are mounted during assembly.

SUMMARY OF THE INVENTION

It is therefore an object of the present invention to provide a split mechanical face seal that is easy to assemble and disassemble.

Another objects of the present invention is to provide a split mechanical face seal wherein the biasing members are carried on a single piece spring retainer.

Yet another object of the present invention is to provide a split mechanical face seal having a removable alignment sleeve for ease of assembly.

The above and other objects of the present invention will become apparent from the drawings, the description given herein and the appended claims.

In one embodiment, the split mechanical face seal of the present invention includes a rotating seal ring assembly having a rigid seal ring of split ring segments forming rotating seal ring faces and a pair of attachable body ring segments holding the rotating seal rings segments together when the body ring segments are attached. There is also a stationary seal ring assembly comprising a rigid seal ring of split ring segments forming stationary seal ring faces and a pair of attachable housing segments holding the stationary seal ring segments together when the housing segments are attached. A single segment retainer ring has a split forming first and second opposing end faces. The retainer ring is made of a material that has sufficient flexibility such that the first and second end faces can be spread apart by a distance at least equal to the diameter of the circle formed when the first and second faces are in engagement. The retainer ring has first and second axially facing surfaces, the retainer ring being operatively engaged with the stationary seal ring segments to apply a biasing force thereto by means of resilient members carried by the retainer ring and that engage axially facing abutments formed by the housing segments when the housing segments are attached.

In another embodiment of the present invention, there is provided a split mechanical face seal with a positioning collar or sleeve that holds the stationary seal ring assembly in a generally concentric relationship with respect to a shaft upon which the face seal is mounted, the positioning collar being removable when assembly of the split mechanical face seal is completed.

BRIEF DESCRIPTION OF THE INVENTION

FIG. 3 is a cross-sectional view taken along the lines 3—3 of FIG. 1;

DESCRIPTION OF THE PREFERRED EMBODIMENTS

Figure 1:
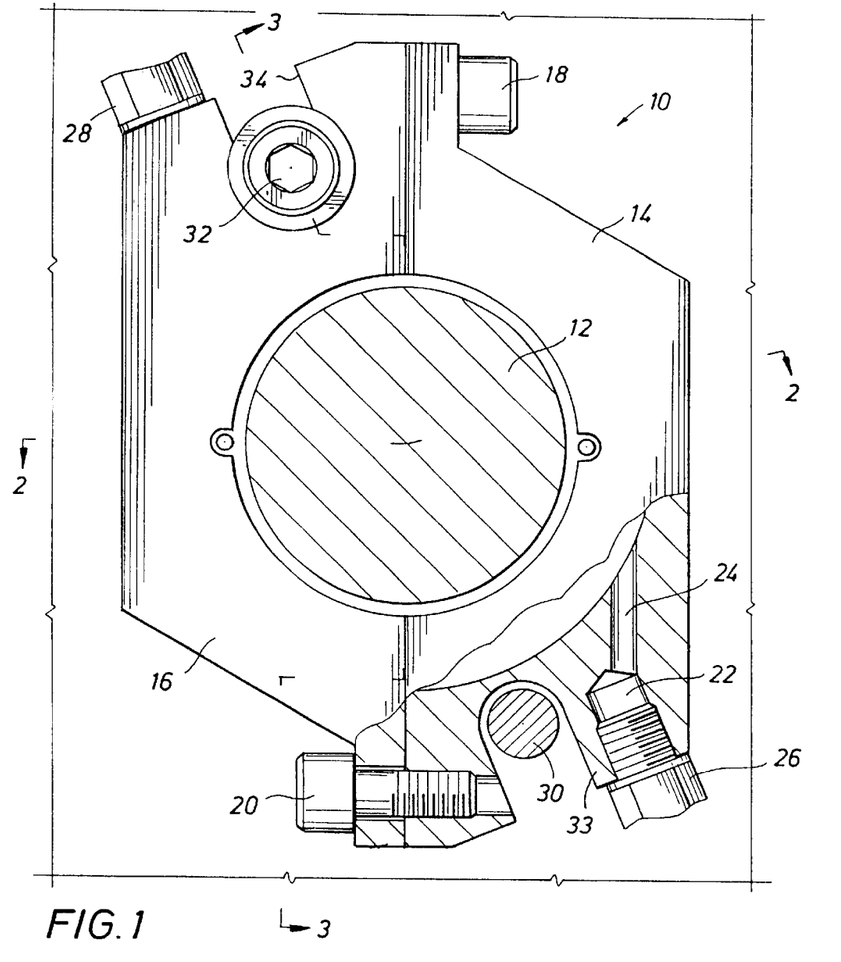
FIG. 1 is an end, elevational view, partly in section, of the split mechanical face seal of the present invention.
Figure 2:
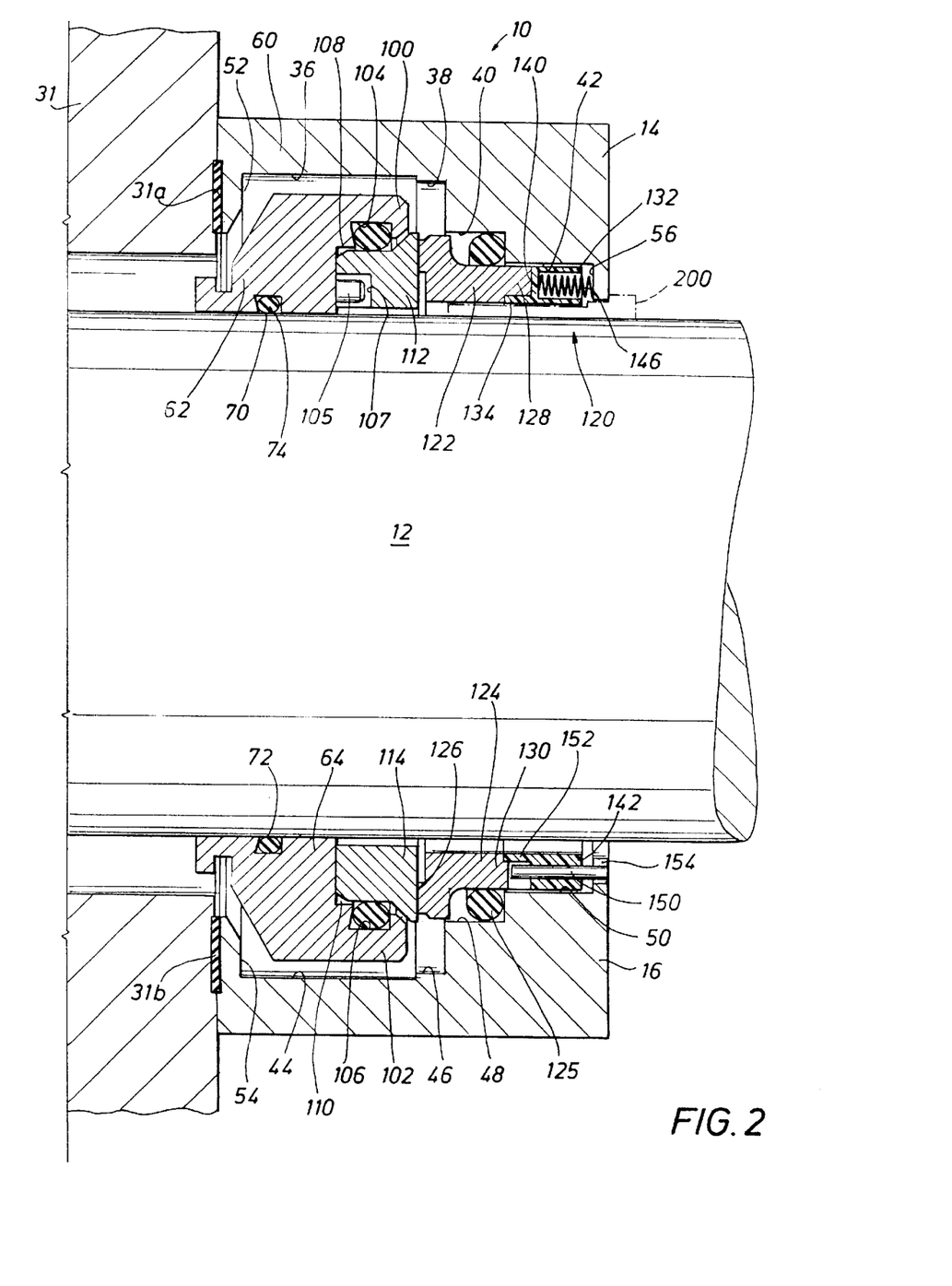
FIG. 2 is a cross-sectional view taken along the lines 2—2 of FIG. 1.

With reference now to the drawings, FIG. 1 shows the mechanical seal, shown generally as 10, affixed to a rotating shaft, e.g., a pump shaft, 12. As can be seen, mechanical seal 10 comprises gland or housing segments 14 and 16 that are attachable to one another by means of bolts 18 and 20. Gland segment 14 is provided with a lubricant port 22 that communicates with a passageway 24 by means of which a lubricant fluid can be introduced internally of mechanical seal 10, port 22 being selectively closed with a removable plug 26. In like fashion, gland half 16 is provided with a lubrication system and plug 28. Mechanical seal 10 is secured to the stuffing box 31 of a pump or the like, gland or housing segment 14 being secured by means of a threaded bolt 30 in a slot 33, gland segment 16 being secured by means of a threaded bolt 32 received in a slot 34. As best seen in FIG. 2, gland segments 14, 16 are sealed to stuffing box 31 by means of semicircular gaskets 31a and 31b.

Figure 3:
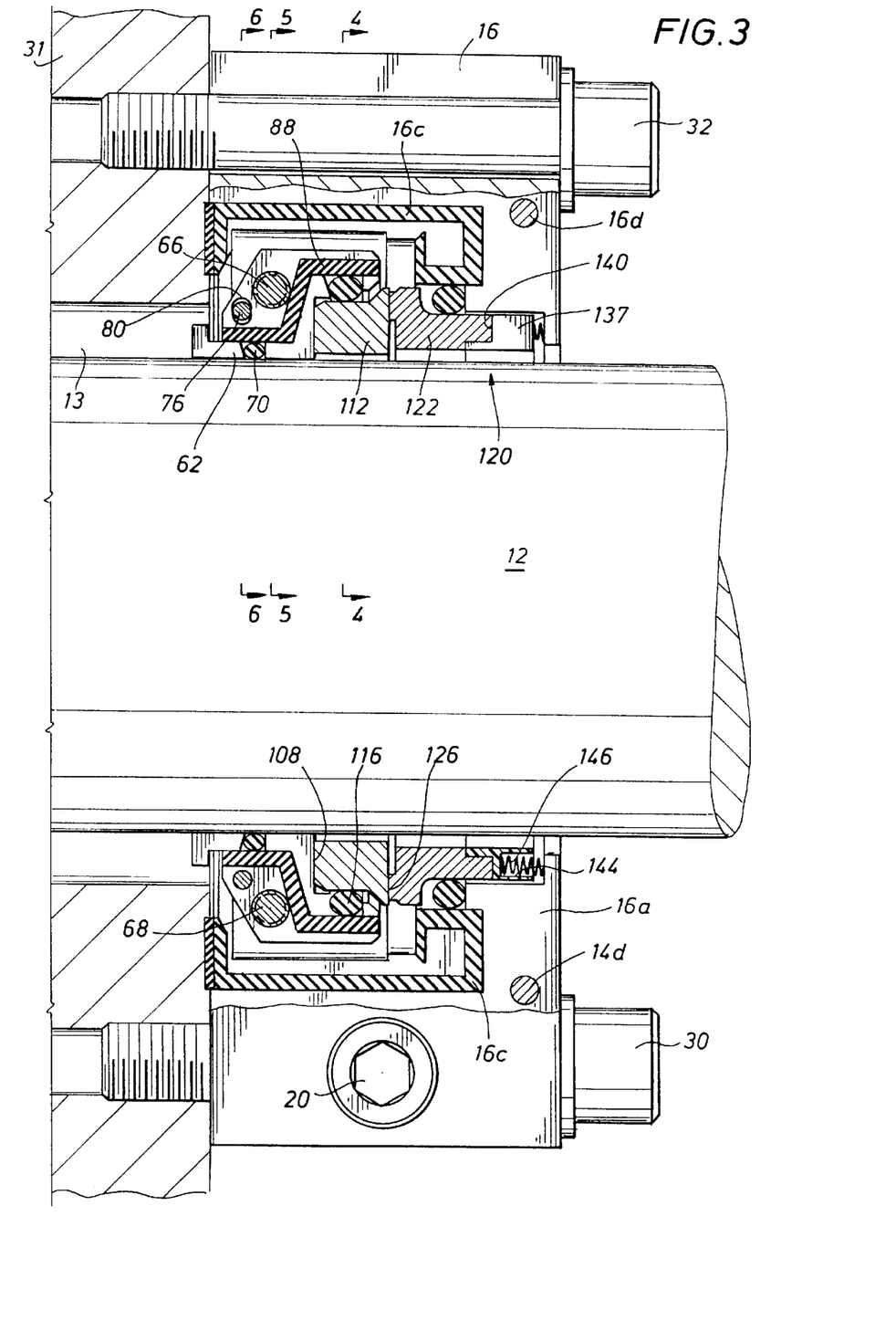
FIG. 3 is a view similar to FIG. 2 but showing the positioning collar.
Figure 4:
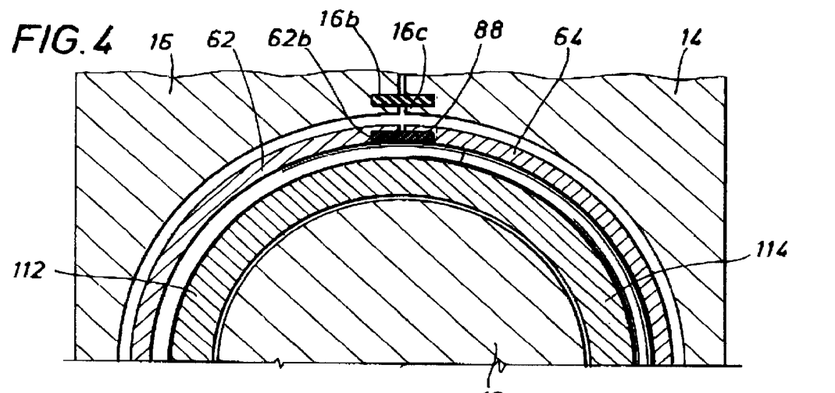
FIG. 4 is a cross-sectional view taken along the lines 4—4 of FIG. 3.

It will be understood that gland segments 14 and 16 are identical to one another to the extent that if gland section 14 is rotated 180° around shaft 12, it will be identical to gland segment 16. Accordingly, with reference to FIG. 3, the mechanical seal of the present invention will be described with respect to gland 16. Gland 16 has a gland face 16a. Formed in gland face 16a is a generally G-shaped groove 16b (see FIG. 4) in which is positioned complementary-shaped gasket 16c. An aligning pin 16d protruding from gland face 16a is received in a registering bore in the mating face of gland 14, while an aligning pin 14d is likewise received in a registering bore in gland face 16a. When the gland segments 14 and 16 are attached, the gaskets 16c will be received in the registering grooves, as seen in FIG. 4.

As seen in FIG. 2, gland segment 14 is provided with generally semicircular, internally formed recesses 36, 38, 40, and 42, while gland segment 14 is provided with registering semicircular, internally formed recesses 44, 46, 48, and 50. It will be appreciated that when the gland halves 14 and 16 are connected, as shown, recesses 36 and 44 cooperate to form an annular recess, as is the case with recesses 38, 46; 40, 48; and 42, 50. Recess 36 in gland segment 14 is partially defined by an end wall 52, while recess 44 in gland segment 16 is partially defined by an end wall 54, end walls 52 and 54 cooperating to define an annularly extending, axially facing coplanar engagement surface when gland segments 14 and 16 are connected, as shown. Recess 42 is partially defined by an end wall 56, opposite end wall 52, while recess 50 is partially defined by an end wall 58, opposite end wall 54. When gland segments 14 and 16 are attached, end walls 56 and 58 cooperate to define an axially facing, annularly extending coplanar abutment.

Figure 5:
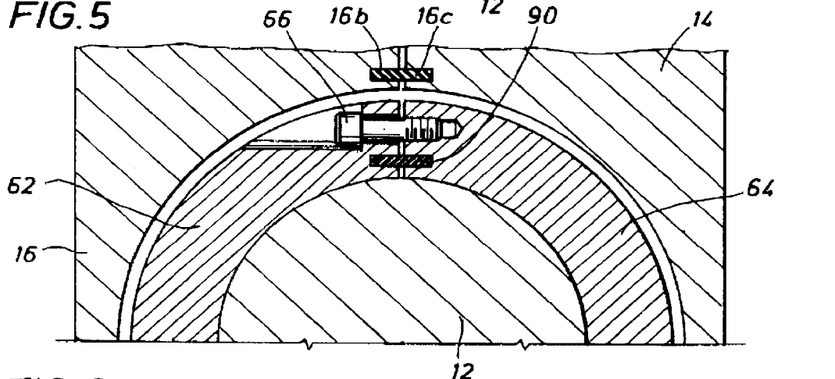
FIG. 5 is a cross-sectional view taken along the lines 5—5 of FIG. 3.
Figure 6:
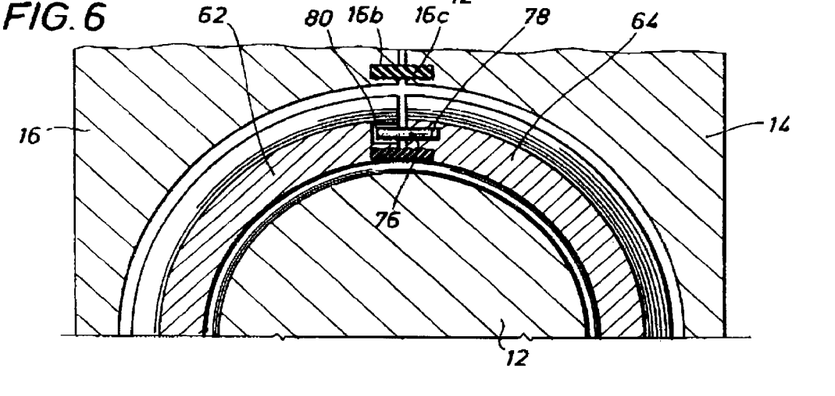
FIG. 6 is a cross-sectional view taken along the lines 6—6 of FIG. 3.

Received in recess 36, 44 is a rotating seal ring assembly, shown generally as 60. Seal assembly 60 comprises a first body segment 62 and a second body segment 64 (see FIG. 2) that are identical and that are generally semicircular and attachable by means of bolts, one of which is shown in FIG. 5 as 66, the other of which is shown in FIG. 3 as 68. Body segments 62 and 64 are provided with registering O-ring grooves 70 and 72, respectively, that receive a split O-ring 74 to effect a seal between body segments 62 and 64 and shaft 12. As disclosed more fully in U.S. patent application Ser. No. 09/656,190, entitled "Method and Apparatus for Applying a Split Mechanical Seal to a Rotatable Shaft," filed contemporaneously herewith, naming Michael A. London as inventor, and incorporated herein by reference for all purposes, it will be appreciated that when bolts 66 and 68 are tightened to attach body segments 62 and 64 together, body segments 62, 64 essentially form a unitary body that is tightly clamped onto, and rotates with, shaft 12. For ease of assembly, an aligning pin 76 is received snugly in a bore 78 in body segment 64 and loosely received in a registering bore 80 in body segment 62. Conversely, a second aligning pin is received snugly in a bore in body segment 62 and loosely received in a registering bore, such as bore 80 in body segment 64. As more fully disclosed in U.S. patent application Ser. No. 09/656,190, the aligning pins, e.g. pin 76, serve to prevent relative axial movement between body segments 62 and 64 but permit limited radial, flexing movement between body segments 62 and 64, ensuring tight engagement of body segments 62 and 64 with shaft 12. The mating end faces of body segments 62 and 64 are identical and, as shown with respect to body segment 62, are provided with Z-shaped channels in which are received Z-shaped gaskets, e.g. gasket 88, Z-shaped gasket 88 having a portion received in Z-shaped grooves 62b in body segment 62 and a portion received in Z-shaped grooves 64b in body segment 64. It will thus be seen that when bolts 66 and 68 are tightened, body segments 62 and 64 will be securely affixed to shaft 12 and will be in fluid-tight engagement with one another by virtue of Z-shaped gaskets 88.

Figure 7:
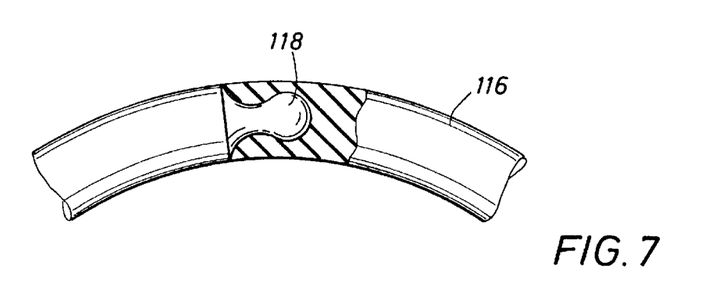
FIG. 7 is a fragmentary, elevational view, partly in section, of an O-ring used in a split mechanical face seal of the present invention.

Body segment 62 is provided with an axially extending lip 100, while body segment 64 is provided with an axially extending lip 102. Lips 100 and 102 in turn have radially outwardly opening registering grooves 104 and 106, respectively. In effect, lips 100 and 102, when body segments 62 and 64 are attached, form a radially outwardly extending annular recess having recess portions 108 and 110. Received in recess portion 108 is a rotating seal ring segment 112, while a rotating seal ring segment 114 is received in recess 110. A split O-ring 116 connected by a ball and socket arrangement (see FIG. 7) provides sealing between seal ring segments 112 and 114 and the lip portions 100 and 102 of body segments 62 and 64, respectively. A drive pin 105 received in a ball in body segment 62 and a registering recess 107 in seal segment 112 ensures that the seal segments 112, 114 rotate with the body segments 62, 64.

The stationary seal assembly, shown generally as 120, includes stationary seal ring segments 122 and 124. Stationary seal ring segments 122 and 124 have lapped seal faces that engage lapped seal faces on rotating seal ring segments 112 and 114, as shown at 126. Seal ring segment 122 is generally L-shaped when viewed in transverse cross-section and has an axially extending portion 128 that is received in recess 42, while rotating seal ring segment 124 has an axially extending portion 130 that is received in recess 50. It will be seen that when the mechanical seal 10 is assembled, seal segments 122 and 124 form a counterbore 134.

A retainer ring 132 has an axially extending lip 136 that is received in counterbore 134. Unlike the components heretofore described, which are basically segmented into two pieces with the exception of the O-rings, retainer ring 132 is a single segment having one butt cut, as shown in FIG. 3, thereby forming opposed end faces, one end face being shown as 137. Retainer ring 132 has a first axially facing surface 140 that abuts seal ring segments 122 and 124 and a second axially facing surface 142 in which are formed a plurality of circumferentially disposed cylindrical bores 144, a series of compression coil springs 146 being positioned in bores 144. As can be seen, springs 146 engage end wall 56 and 58 of housing segments 14 and 16 and accordingly serve to bias retainer ring 132 against stationary seal ring segments 122 and 124, with the concomitant result that the seal faces on the stationary seal segments 122, 124 are forced into sealing engagement with the seal faces on rotating seal segments 112 and 114. Further, since body segments 62 and 64 are in engagement with end wall 52 and 54 of gland segments 14 and 16, the stationary seal faces formed on stationary seal ring segments 122 and 124 remain in engagement with the seal faces on rotating seal ring segments 112 and 114. Radial sealing between seal ring segments 122, 124 and gland segments 14, 16 is accomplished by a split O-ring 125.

To prevent stationary seal ring segments 122, 124 and retainer ring 132 from rotating, an anti-rotation pin 150 is received axially through a bore in retainer ring 132, one end of anti-rotation pin 150 being received in a recess 152 and stationary seal segment 124, the other end of pin 150 being received in a slot 154 of housing segment 16.

As noted, retainer ring 132 is of a single segment having a butt cut or single slice forming opposed end faces, the opposed faces when in engagement forming a circular ring. Retainer ring 132 is made of a material that has sufficient flexibility that the opposed end faces, as described above, can be separated by a distance equal to the diameter of the circular ring formed when the end faces are in engagement. Although a split retainer could be made of certain metals that have the requisite flexibility, more generally retainer ring 132 would be made of a plastic or polymeric material or a composite, materials such as polytetrafluorethylene, certain polyolefins, nylon, certain polyurethanes, fiberglass composites, and the like being preferred. It will be apparent that the material from which retainer ring 132 is made must be sufficiently hard so as to not be deformed to the point that the biasing effect of the springs is lost or greatly minimized. An advantage of using a polymeric material such as polytetrafluoroethylene is that when bores are used to retain the individual springs, the bores can be made slightly undersized so as to hold the springs in place while the retainer ring is being manipulated during installation.

While coil springs are shown as the biasing means, it would be possible to use other resilient means carried by the retainer ring. For example, individual leaf springs could be mounted on the retainer ring as long as such rings did not interfere with the ability to spread the end faces of the retainer ring sufficiently to place it over the shaft on which the mechanical seal is to be mounted, with the retainer ring then assuming its relaxed position—i.e., with the end faces abutting or at least adjacent one another. Also, a resilient member that could be opened—i.e., spread like retainer ring 132—could be employed.

Figure 2A:
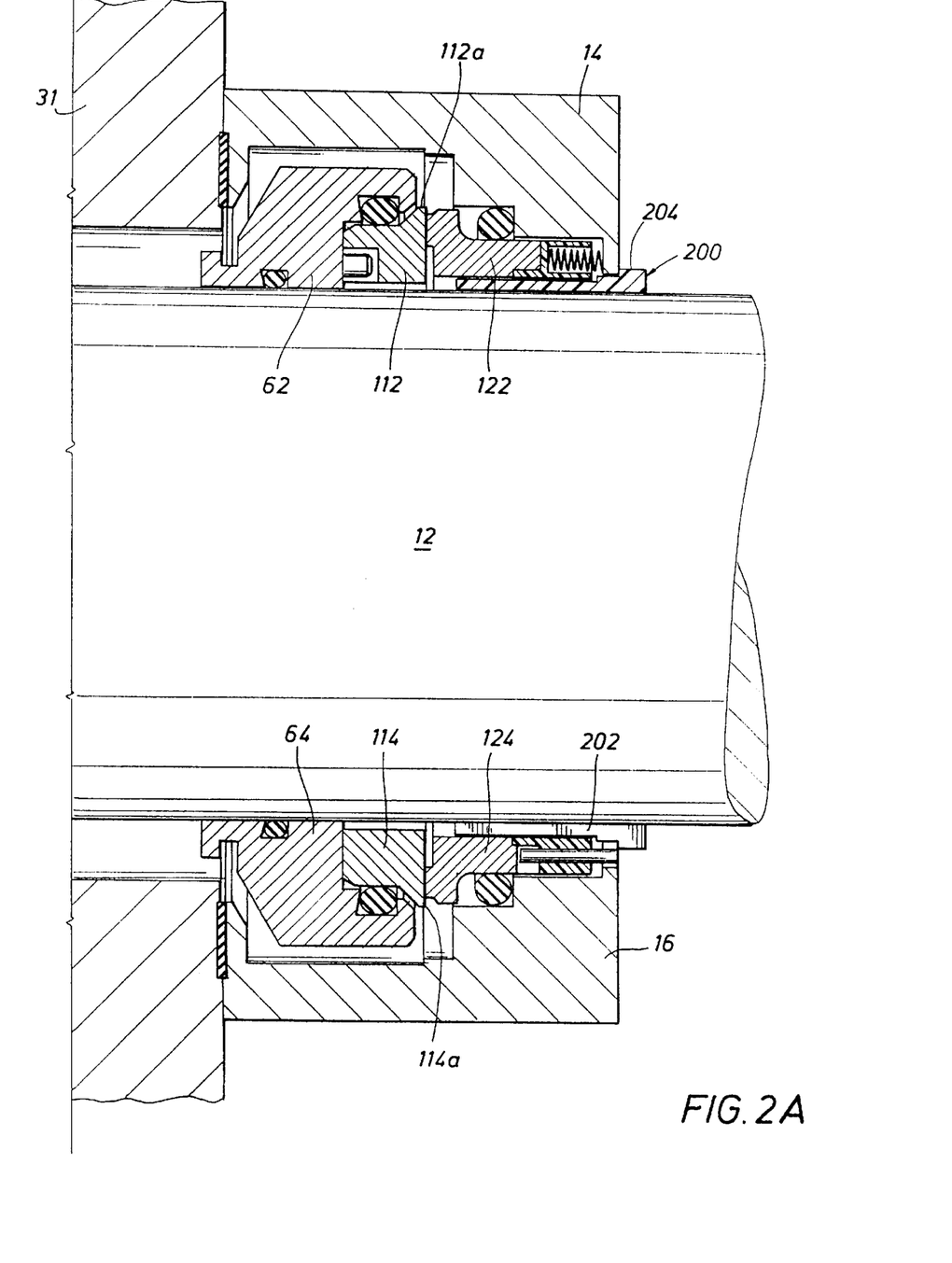

As noted above, normally the installation of split mechanical face seals of the type under consideration poses a problem because of the fact that inherently there are numerous parts, e.g., the gland segments, the stationary seal segments, and, if carried by a retainer ring according to the present invention, the biasing springs, that need to be maintained substantially coaxial with the shaft on which they are being mounted. To alleviate this problem, as shown in FIG. 2a, the present invention provides a positioning collar or spacer, shown generally as 200. Collar 200 is again of a single segment having a single split or butt cut forming opposed end faces, one of which is shown as 202. Collar 200 has an enlarged head portion 204 that has an outer diameter greater than the diameter formed by the bore of the gland segments 14, 16 when the gland segment are attached. Accordingly, the positioning collar or sleeve is prevented from being pushed inside of the gland segments 14, 16. The collar 200 can be made of polymeric materials, such as those name above with respect to retainer ring 132. While the positioning collar is particularly useful where there are stationary seal ring segments and a retainer ring or other supports, separate from the gland segments, for holding biasing springs, the collar can also be used with advantage where there are only gland segments and stationary seal ring segments, e.g., where the biasing springs are carried by the gland segments.

In installing the mechanical seal of the present invention on a shaft such as a pump shaft, the rotary seal assembly is first positioned on the shaft. In this regard, the body segments are first positioned around the shaft, the body segments being tightened together sufficiently to hold together but still allow the rotary seal ring segments to be positioned into the body segments. The stationary seal assembly can then be installed, the retaining ring being engaged with one of the stationary seal ring segments such that the anti-rotation pin is engaged. The positioning collar is then spread and positioned on the shaft to hold the stationary seal ring segments and retainer ring in a concentric relationship around the shaft, the stationary seal assembly being moved up against the rotary seal assembly. Lastly, the gland segments are positioned over the rotary and stationary seal assemblies and the positioning collar, care being taken to ensure that the anti-rotation pin is received in a gland slot. Once the gland segments have been tightened together, the now unitary gland can be securely tightened to the stuffing box. At this point, the positioning collar can be removed (see that collar 200 is shown in phantom in FIG. 2), and the mechanical seal is ready for operation.

Figure 8:
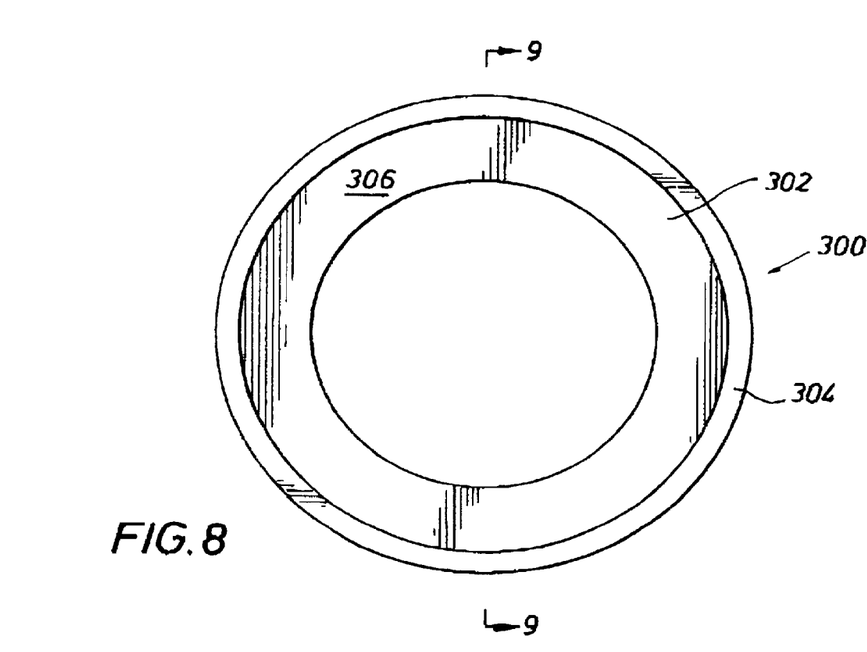
FIG. 8 is a planar view of an installer ring for use in installing the rotating seal segments of the mechanical seal of the present invention.
Figure 9:
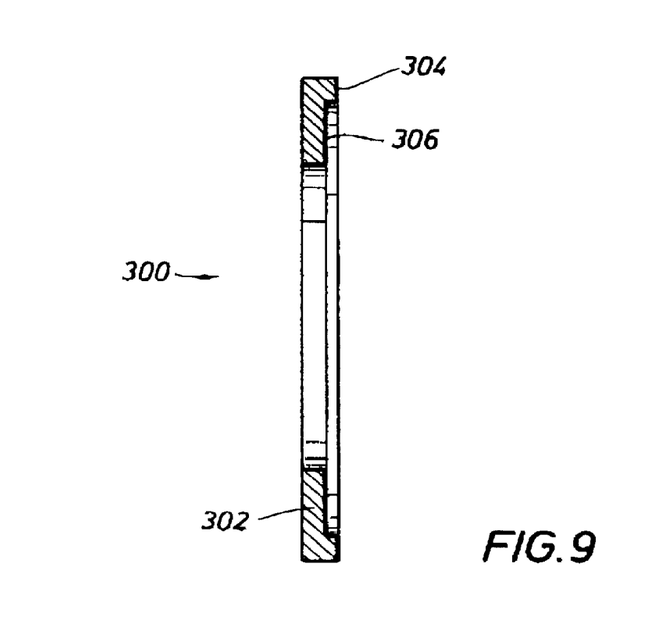
FIG. 9 is a view taken along the lines 9—9 of FIG. 8.

To facilitate installation of the rotary seal segments, it is desirable to use an installer ring, shown generally as 300 in FIG. 8. Installer ring 300 is a single segment piece having one butt cut to provide opposed end faces that can be brought into engagement to essentially form a complete annular body. Installer ring 300 can be made of the same material as described above with respect to the positioning collar and the retainer ring. Installer ring 300 includes a ring-shaped, generally flat member 302 that, prior to being butt cut, would form an annular ring from which projects a peripheral lip portion 304. As best seen in FIG. 9, member 302 and lip 304 cooperate to form, when butt cut, end faces that are generally L-shaped when viewed in transverse cross-section. To use installer ring 300, the rotating seal ring segments 112 and 114 are positioned such that the portions thereof that form the seal faces are placed against the surface 306 of member 302. In this regard, it should be observed that installer ring 300 has the same flexibility as that described above with respect to the positioning collar. It will be appreciated that once the seal faces of the rotating seal ring segments are pressed against surface 306, the peripheral lip 304 will engage the radially outermost portions 112a and 114a (see FIG. 2A) of rotating seal segments 112 and 114. Accordingly, rotating seal rings segments 112 and 114 are now held with their seal faces coplanar because they are in engagement with the surface 306 of member 302. Additionally, lip 304 holds the seal ring segments in a generally concentric relationship with respect to shaft 12. Accordingly, in installing the rotating seal ring segments, an installer ring would be placed around the shaft 12, following which the rotating seal ring segments would be placed into the installer ring as described above whereupon the assembly comprised of the installer ring and the rotating seal ring segments could be held in place and moved axially into body segments 62 and 64, at which point installer ring 300 can be removed and the assembly of the mechanical seal completed.

The foregoing description and examples illustrate selected embodiments of the present invention. In light thereof, variations and modifications will be suggested to one skilled in the art, all of which are in the spirit and purview of this invention.

What is claimed is:

1. A split mechanical face seal comprising:

a rotating seal ring assembly comprising a rigid seal ring of split ring segments forming rotating seal ring faces and a pair of attachable body ring segments holding said rotating seal ring segments together when said body ring segments are attached;

a stationary seal ring assembly comprising a rigid seal ring of split ring segments forming stationary seal ring faces and a pair of attachable housing segments holding said stationary seal ring segments together when said housing segments are attached;

a single segment retainer ring having a split forming first and second opposing end faces, said retainer ring being made of a material that has sufficient flexibility such that said first and second end faces can be spread apart by a distance at least equal to the diameter of the circle formed when said first and second end faces are in engagement, said retainer ring having first and second axially facing surfaces, said retainer ring being operatively engaged with said stationary seal ring segments; and at least one resilient member carried by said retainer ring and extending from said second axially facing surface, said housing segments forming axially facing abutments for operative engagement by said resilient member when said housing segments are attached whereby said retainer ring exerts a biasing force against said stationary seal ring faces in a direction toward said rotating seal ring faces.

2. The mechanical seal of claim 1, further including an anti-rotation assembly for preventing rotation of said stationary seal ring assembly relative to said rotating seal ring assembly.

3. The mechanical seal of claim 1 wherein said anti-rotation assembly is engaged with at least one of said housing segments, said spring retainer ring, and at least one of said stationary seal ring segments.

4. The mechanical seal of claim 3 wherein said anti-rotation assembly comprises a pin extending through said spring retainer ring, said pin having a first end received in an opening in one of said stationary seal ring segments and a second end received in an opening in one of said housing segments.

5. The mechanical seal of claim 1 wherein there are a plurality of said resilient members.

6. The mechanical seal of claim 5 wherein there are a plurality of circumferentially displaced bores in said second axially facing surface in said retainer ring and said resilient members comprise coil springs received in said bores.

7. The mechanical seal of claim 1 wherein said retainer ring is made of a plastic material.

8. The mechanical seal of claim 7 wherein said plastic material comprises polytetrafluoroethylene.

9. The mechanical seal of claim 1 wherein said first axially facing surface on said retainer ring abuts said stationary seal ring segments.

10. The mechanical seal of claim 1, further comprising a removable sleeve adapted to center said stationary seal ring assembly, said retainer ring, and said housing segments with respect to a shaft on which said stationary seal ring assembly, said retainer ring, and said housing segments are positioned, said sleeve being a single segment having a split forming first and second opposing end faces, said sleeve being made of a material that has sufficient flexibility such that said first and second end faces can be spread apart by a distance at least equal to the diameter of the circle formed when said first and second end faces are in engagement, said sleeve being removable when said housing segments are attached.

11. The mechanical seal of claim 1 wherein said rotating seal ring assembly is positioned in said housing segments when said housing segments are attached.

12. The mechanical seal of claim 10 wherein said housing segments, when attached, form annularly extending, radially facing stop surfaces, said stop surfaces being opposed to said abutments, said body ring segments being in engagement with said stop surfaces when said body ring segments and said housing segments are attached.

13. In a split mechanical face seal having a rotating seal ring assembly comprising a rigid seal ring of split ring segments forming rotating seal ring faces and a pair of attachable body ring segments holding said rotating seal ring segments together when said body ring segments are attached, a stationary seal ring assembly comprising a rigid seal ring of split ring segments forming stationary seal ring faces and a pair of attachable housing segments holding said stationary seal ring segments together when said housing segments are attached, the improvement comprising a removable sleeve adapted to center said stationary seal ring assembly with respect to a shaft on which said stationary seal ring assembly is positioned, said sleeve being a single segment having a split forming first and second opposing sleeve end faces, said sleeve being made of a material that has sufficient flexibility such that said first and second sleeve end faces can be spread apart by a distance at least equal to the diameter of a circle formed when said first and second sleeve end faces are in engagement.

14. The mechanical seal of claim 13, further including a single segment retainer ring having a split forming first and second opposing ring end faces, said retainer ring being made of a material that has sufficient flexibility such that said first and second ring end faces can be spread apart by a distance at least equal to the diameter of a circle formed when said first and second ring end faces of said retainer ring are in engagement, said retainer ring having first and second axially facing surfaces, said retainer ring being operatively engaged with said stationary seal ring segments; and at least one resilient member carried by said retainer ring and extending from said second axially facing surface, said housing segments forming axially facing abutments for operative engagement by said resilient member when said housing segments are attached whereby said retainer ring exerts a biasing force against such stationary seal ring faces in a direction toward said rotating seal ring faces.

15. The mechanical seal of claim 14 wherein there are a plurality of said resilient members.

16. The mechanical seal of claim 15 wherein there are a plurality of circumferentially displaced bores in said second axially facing surface in said retainer ring and said resilient members comprise coil springs received in said bores.

17. The mechanical seal of claim 14 wherein said retainer ring is made of a polymeric material.

18. The mechanical seal of claim 17 wherein said polymeric material comprises polytetrafluoroethylene.

19. The mechanical seal of claim 14 wherein said first axially facing surface on said retainer ring abuts said stationary seal ring segment.

20. The mechanical seal of claim 13 wherein said sleeve is made of a polymeric material.

21. The mechanical seal of claim 13 wherein said sleeve is removable when said housing segments are attached.

\* \* \* \* \*